Sept. 30, 1958    R. A. MAGNUSON    2,853,893
SPUR GEAR PINION MOUNTING
Filed June 25, 1957

INVENTOR.
ROLAND A. MAGNUSON
BY
W. E. Thibodeau, T. J. Lynch + R. M. Lyon

United States Patent Office 2,853,893
Patented Sept. 30, 1958

2,853,893

SPUR GEAR PINION MOUNTING

Roland A. Magnuson, Seattle, Wash., assignor to the United States of America as represented by the Secretary of the Army Application June 25, 1957, Serial No. 668,005

5 Claims. (Cl. 74—411)

The invention pertains to a pinion spur gear mounting, and particularly relates to a pinion of the self-aligning type.

In gear and speed reduction units, it is often advantageous to use a meshing small pinion and large gear to provide efficient reduction in a limited space. However, the torques transmitted by a conventional gearing system wherein the pinion is rotatably supported by a bearing on each side thereof, are limited by the stresses imposed on the pinion teeth where the usual practice is to design the face width of the pinion up to five times the circular pitch. Even at this ratio, the deflection of the pinion caused by heavy loads imposed thereupon will considerably reduce the effective face width due to uneven load distribution on the pinion teeth.

Uniform loading across the pinion face width, and consequently minimum stress for a given torque, occurs when the pitch line of the loaded pinion tooth is straight and parallel to the pitch line of the mating tooth of the gear, and it is an object of the invention is to provide a pinion gear mounting which will automatically maintain parallelism between the pitch lines of the pinion and gear teeth.

Another object of the invention is to provide a pinion spur gear mounting which will, in effect, decrease the face width to circular pitch ratio by one-half without decreasing the strength and torque transmitting capacity of the pinion.

A further object of the invention is to provide a pinion spur gear mounting which automatically aligns the pinion with the gear for optimum stress and wear characteristics.

These and other objects of the invention will be best understood when viewed with regard to the following description and accompanying drawings wherein.

Figure 1:
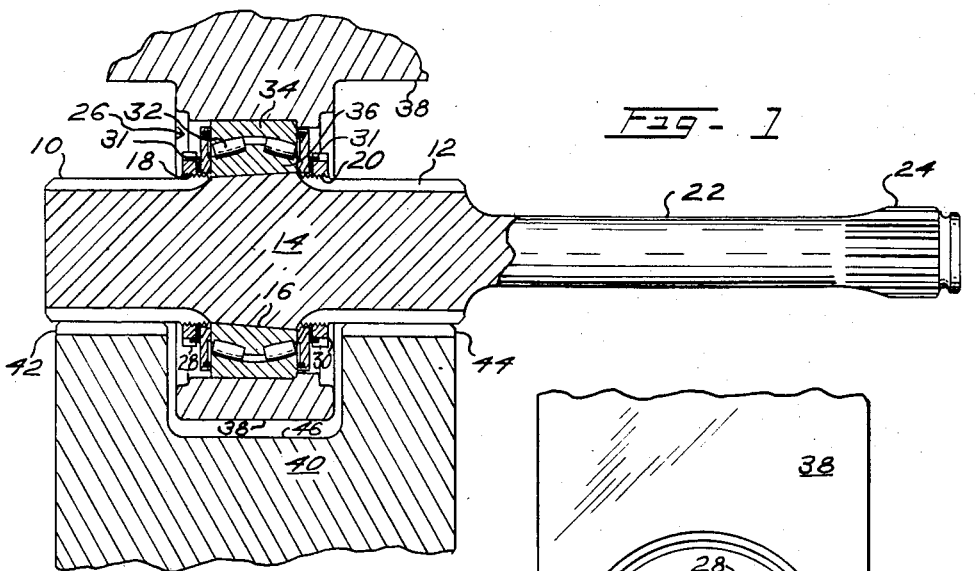
Fig. 1 is a cross-sectional view of a pinion and mounting embodying the concepts of the invention.
Figure 2:
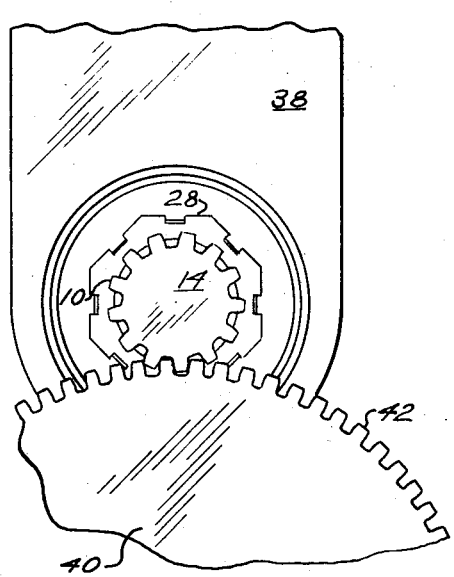
Fig. 2 is an elevational view taken from the left of Fig. 1.

The invention may take the form shown in Fig. 1 wherein a pair of equal width spur gear teeth sets 10 and 12 are machined in spaced relation on a hub 14. Intermediate the gears 10 and 12 a tapered surface 16 is ground, serving as the bearing seat, and on each side of surface 16, adjacent the gear teeth, the hub 14 is threaded as at 18 and 20. A shaft 22 is formed integral with the hub 14 and extends axially therefrom. The shaft 22 is of sufficient length, in relation to its diameter, to flex under medium bending loads imposed on hub 14 and is splined at 24 for connection with the drive means.

A self-aligning bearing 26 is positioned on the surface 16 and locked thereon by the nuts 28 and 30 which are screwed onto the threads 18 and 20, respectively. Lock washers 31 are interposed between the bearing and nuts preventing accidental unloosening of the nuts 28 and 30. It will be noted that the rollers 32 of bearing 26 and the outer race 34 are of spherical configuration, thus the axis of the inner race 36 and hub 14 may pivot about the center of the spherical surface of outer race 34. The bearing 26 is press fitted into the journal block 38 providing the support for the entire pinion assembly.

The large gear 40 is formed with two separate sets of teeth 42 and 44 of equal width engaging pinion teeth 10 and 12, respectively, and must be recessed at 46 to provide clearance for the bearing block 38.

The advantage of the above pinion spur gear mounting over the conventional pinion, wherein the bearings are mounted at the end of the pinion or on both sides thereof, lies in the ability of the pinion hub 14 to position itself relative to the gear teeth 44 and 46, under various load conditions, such that the pitch line of the pinion gear teeth will be substantially straight and parallel to the pitch line of the gear teeth 46 and 44 providing optimum wear and stress characteristics. The self-aligning of hub 14 is achieved by the forces exerted on the pinion teeth 10 and 12 by the gear teeth 44 and 46 due to mismatching of the meshing teeth and non-parallelism of the pitch lines of the pinion and gear. Since the bearing 26 is of the self-aligning type and the shaft 22 may be flexed, the pinion hub is permitted limited pivotal movement about the center of the spherical surface constituting the outer bearing race 34 and may, consequently, adapt itself to balance the forces on teeth 10 and 12 providing maximum efficiency for any load condition within the pinion's torque transmitting limits.

Figure 3:
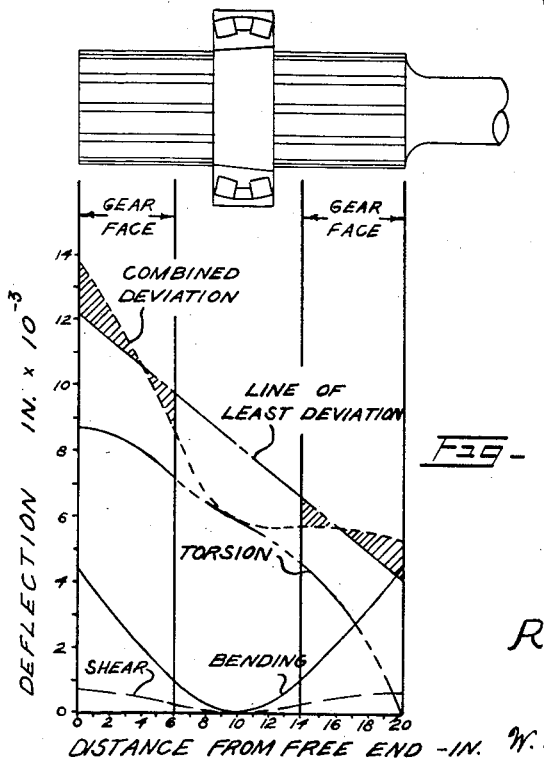
Fig. 3 is an illustration of a graph disclosing stress analysis of a gear supported in accordance with the invention.

A graph, illustrating the theory of a pinion employing the invention's construction, is shown in Fig. 3 wherein the horizontal axis represents the distance along the face of the pinion from the free end, and the vertical axis represents deflection of the pinion under a given load. The total deflection of the pinion is the result of a combination of deflections caused by shear, bending and torsion forces and is represented by the dotted line. The line of least deviation is shown by the dot-dash line and is a straight line. Thus, any difference of the combined deflection line from the line of least deviation, represented by the shaded area, indicates mismatching of the mating pinion and gear teeth. It will be observed that, as the actual combined deflection line approximates the theoretical line of least deviation within the teeth meshing portions of the pinion and extends in substantially the same direction, the mismatching of the meshing teeth is minimized resulting in the best possible efficiency of power transmission between pinion and gear.

It will be thus understood that the invention permits a pinion spur gear to be mounted in such a manner to permit self-alignment with the meshing gear teeth resulting in a uniform loading across the pinion teeth improving power transmission and wear and stress characteristics of the pinion. The construction is economical to manufacture, utilizing readily available components and may be easily disassembled for repair and service.

The concepts of the invention are not intended to be limited to the disclosed embodiment as it will be understood that the invention may take various forms without departing from the spirit and scope thereof.

I claim:

1. A pinion spur gear comprising, in combination, a hub, a pair of gear teeth sets formed on the periphery of said hub in axial spaced relation, a self-aligning bearing supporting said hub intermediate said gear teeth sets and flexible means drivingly connected to said hub.

2. A pinion spur gear comprising, in combination, a hub, a flexible shaft formed integral and coaxially with said hub, a pair of gear teeth sets formed on the periphery of said hub in spaced axial relationship, a self-aligning bearing supporting said hub intermediate said gear teeth sets and locking means mounted on said hub engaging said bearing.

3. A pinion spur gear for use with a gear having axially spaced gear teeth sets, comprising, in combination, a hub, a flexible shaft extending coaxially from said hub, first and second sets of gear teeth formed in axial spaced relation on the periphery of said hub, a bearing seat formed on said hub intermediate said first and second gear teeth sets, a self-aligning bearing engaging said bearing seat rotatably supporting said hub and lock nuts threaded onto said hub engaging said bearing.

4. A pinion spur gear for engagement with a gear having a pair of axial spaced sets of teeth, comprising a hub, first and second sets of gear teeth of equal width formed in axial spaced relation on the periphery of said hub, a tapered bearing seat formed on said hub intermediate said first and second sets of gear teeth, a flexible shaft formed integral with said hub and extending coaxially therefrom, a spline formed on the end of said shaft for connection with a driving means, threads formed on said hub adjacent each side of said bearing seat, a self-aligning bearing supported within a bearing block engaging said bearing seat and nuts engaging said threads abutting said bearing.

5. In a pinion spur gear, as in claim 4, wherein said self-aligning bearing is of the anti-friction type employing spherical surfaced rollers and races.

References Cited in the file of this patent

UNITED STATES PATENTS

| | | |
|---|---|---|
| 1,031,758 | Westinghouse | July 9, 1912 |
| 1,228,493 | Smith | June 5, 1917 |
| 1,488,119 | Howarth | Mar. 25, 1924 |
| 1,499,617 | Kasley | July 1, 1924 |
| 1,536,092 | Guy et al. | May 5, 1925 |